Oct. 18, 1949.    C. B. WOLFF, JR    2,484,921
DIFFERENTIAL LEVERAGE BRAKE TRANSMISSION
Filed Sept. 6, 1947    2 Sheets-Sheet 1
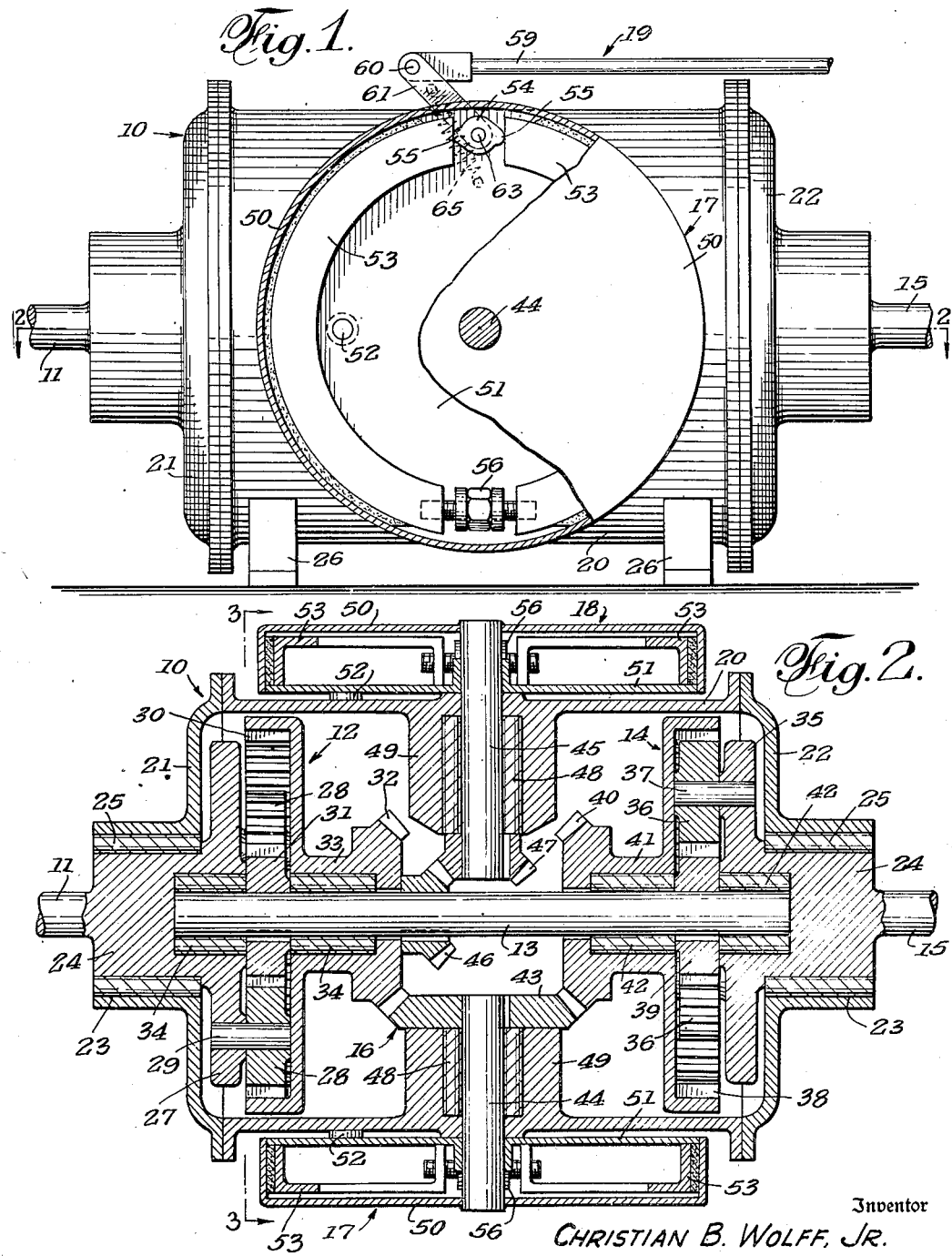
Inventor
CHRISTIAN B. WOLFF, JR.
By C. G. Stratton
Attorney Oct. 18, 1949.  C. B. WOLFF, JR  2,484,921
DIFFERENTIAL LEVERAGE BRAKE TRANSMISSION
Filed Sept. 6, 1947  2 Sheets-Sheet 2

REVERSE  NEUTRAL  FORWARD

Inventor
CHRISTIAN B. WOLFF, JR.
By C. F. Stratton
Attorney

Patented Oct. 18, 1949

2,484,921

UNITED STATES PATENT OFFICE 2,484,921

DIFFERENTIAL LEVERAGE BRAKE TRANSMISSION

Christian B. Wolff, Jr., Butte, Mont.

Application September 6, 1947, Serial No. 772,528

7 Claims. (Cl. 74—760)

1

This relates to speed transmissions and deals more particularly with an automatic differential leverage brake-controlled variable transmission.

An object of the present invention is to provide a transmission embodying planetary gearing and combined with controlled braking means whereby selective operation of the latter effects neutral, forward and reverse operation of the transmission.

Another object of the invention is to provide a transmission of the character indicated that embodies a pair of planetary gear units, one on the input and one on the output side of the transmission, for translating the rotation of an input shaft or driver into forward, reverse or no rotation of an output shaft or driven member, said planetary differentials being controlled by the selective operation of braking means.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view, partly broken away, of a transmission embodying features of the present invention.

Fig. 2 is a plan sectional view thereof as taken on the line 2—2 of Fig. 1.

Figures 4, 5, 6:
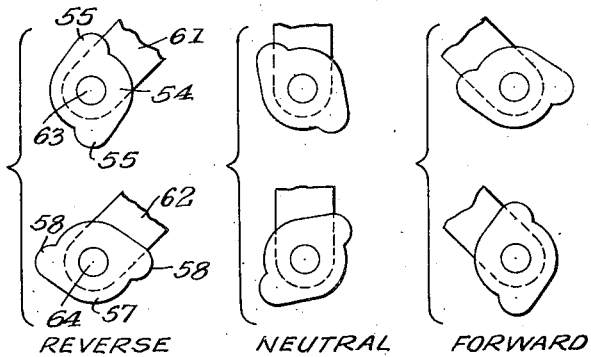

Figs. 4, 5, and 6 are schematic views of means for operating the brakes of the present device and shown in successive operative positions.

The transmission that is illustrated in the drawings comprises, generally, a stationary housing 10, an input shaft 11 entering one end of the housing, a planetary gearing unit 12 driven by said shaft, an intermediate shaft 13 controlled by said gearing unit, a second planetary gearing unit 14 connecting with the shaft 13, an output shaft 15 from the latter unit gearing 16 interconnecting the units 12 and 14, selectively operable brakes 17 and 18 for controlling the operation of the units to, selectively, effect non-rotation, forward rotation or backward rotation of the output shaft 15 during rotation, in one direction of the input shaft 11, and means 19 for controlling the brakes.

The housing 10 comprises a tubular part 20 provided with end cap members 21 and 22. The latter have aligned bores 23 for a cylindrical hub 24 of each shaft 11 and 15 and for anti-friction bearings 25 whereby shafts 11 and 15 are freely rotatable in the housing. Brackets 26 serve to mount the housing upon any suitable support.

The planetary gearing unit 12 comprises a spider 27 which is formed as a circular enlargement of hub 24, a set of planetary spur gears 28 freely rotatable on pins 29 extending from the spider, an internal spur gear 30 having meshing engagement with gears 28, and a sun gear 31 keyed to shaft 13 and also meshed with gears 28. A bevel gear 32 is integrally formed on a tubular hub 33 of the internal gear 30. The shaft 13 extends through hub 31 and into hub 24 and more specifically through suitable anti-friction bearings 34 in said hubs.

The planetary gearing unit 14 is similar to the unit 12 and comprises a spider 35 formed on hub 24 of output shaft 15, a set of planetary spur gears 36 on pins 37 extending from said spider, an internal spur gear 38, and a sun gear 39 keyed to shaft 13. A bevel gear 40 is integrally formed on a tubular hub 41 of the internal gear 38. Anti-friction bearings 42, as before, are provided for shaft 13.

The gearing 16 comprises the mentioned bevel gears 32 and 40, and an interconnecting bevel gear 43 keyed to a shaft 44 at right angles to shaft 13 and extending through the wall of the tubular part 20 of housing 10. Thus shaft 44 is connected to be driven by the internal or ring gear 30. A shaft 45, aligned with shaft 44, by means of bevel gears 46 and 47, is connected to be driven by the sun gear 31. The brakes 17 and 18 are mounted on and control the rotation of said shafts 44 and 45, respectively. The latter are anti-frictionally mounted in bearings 48 in inwardly extending hubs 49 of the housing part 20.

The brake 17 comprises a brake drum 50 fixed to the shaft 44 as by suitable welding, an end closure disc or plate 51 fixed against rotation as by a stud 52, a pair of suitably lined brake shoes 53, a brake shoe expanding element 54 having diametrically opposed lobes 55 for spreading one pair of opposed ends of the brake shoes, and adjustable mounting means 56, carried by plate 51 for the other pair of opposed ends of said brake shoes. The brake 18 is similar to brake 17 and its elements have been given like reference numbers except that the shoe spreading element has been numbered 57 and the lobes thereof 58.

The brake controlling means 19 comprises an operating member 59 having a cross bar 60 on the end thereof, a pair of lever arms 61 and 62 having their free ends pivotally connected to said cross bar, and fulcrum or pivot pins 63 and 64 on said arms respectively, connecting the latter to the respective elements 54 and 57. The member 59 is adapted to be moved endwise to effect movement of arms 61 and 62 through an arc of 90° and movement of the elements 54 and 57 through a similar arc. The end positions of the arms are maintained through the medium of over-center springs 65 or the like.

*Operation*

Figure 3:
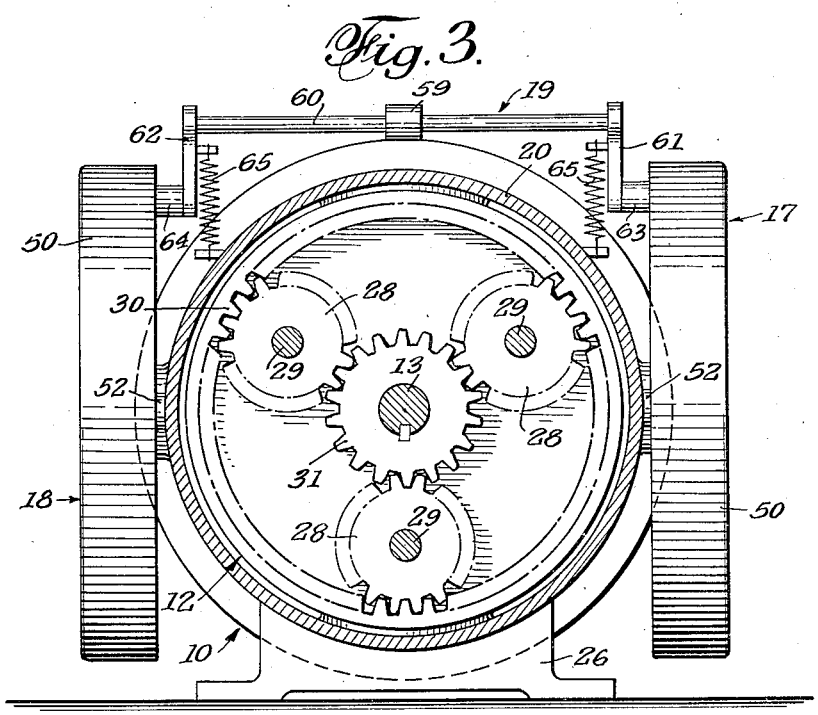
Fig. 3 is cross-sectional view as taken on the line 3—3 of Fig. 2.

Assuming that the input shaft 11, as viewed in the direction of Fig. 3, is clockwise and that the operating member 59 has been moved to bring arms 61 and 62 to the upright positions of Fig. 5 and the brake elements 54 and 57 to positions where the lobes 55 and 58 thereof have a non-spreading relation to brake shoes 53, no drive is transmitted to output shaft 15. This is the neutral position. Rotation of shaft 11 and, consequently, of the spider 27, will bodily rotate pins 29 and the planetary gears 28 around the axis of shaft 11. These latter gears do not revolve on their axes and, therefore, will interlock with ring gear 30 and sun gear 31 to effect a clockwise rotation of both bevel gear 32 and shaft 13. The latter will, therefore, rotate sun gear 39 in a clockwise direction and the former, through bevel gears 43 and 40, will rotate ring gear 38 in a counter-clockwise direction. The opposed rotation of sun gear 39 and ring gear 38 will result in a mere spinning of planetary gears 36 on their pins. Consequently, neither the spider 35 nor the output shaft 15 will rotate.

When rotation of shaft 15 in the opposite direction from driver shaft 11 is desired, the member 59 is moved to the right in Fig. 1 to cause lobes 58 of element 57 to spread brake shoes 53 of brake 18 to frictionally grip drum 50 of said brake. The shaft 45 is thus held against rotation and, through gears 46 and 47, the shaft 13 is held stationary. Now, as the spider 27 rotates clockwise, the planetary gears 28 not only move bodily around the fixed sun gear 31 but roll therearound on their pins 29 in a clockwise direction and set up clockwise rotation of ring gear 30. Through gearing 16, said ring gear 30 rotates ring gear 38 in a counter-clockwise direction to cause similar rotation of the planetary gears 36. Then, since sun gear 39 is held stationary, the spider 35 and shaft 15 will rotate counter-clockwise. This is the reverse drive position of the transmission.

When rotation of shaft 15 in the same direction as driver shaft 11 is desired, member 59 is moved to the left—the position of Figs. 1 and 6—to cause locking of brake 17 to, thereby, lock shaft 44 and, through gearing 16, ring gears 30 and 38. Now, as spider 27 rotates clockwise, the planetary gears 28 not only move bodily but rotate in a counter-clockwise direction on their pins to cause clockwise rotation of sun gear 31, shaft 13, and sun gear 39. Planetary gears 36, because of stationary ring gear 38, will rotate on their pins in a counter-clockwise direction with a resultant clockwise rotation of spider 35 and output shaft 15. This is the forward drive position of the transmission.

The brakes 17 and 18, as employed in the present transmission are responsible for a constant pressure factor that is applied with the leverage values of gearing units 12 and 14 to maintain a variable ratio change which will constantly remain opposed to forces caused by changing road conditions. Accordingly, the present transmission is adapted to be applied to each of the four wheels of a vehicle to obtain four-wheel steering that is safe and efficient.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A gear transmission comprising a housing, end closures on the housing, input and output spider elements respectively journalled in the closures at opposite ends of the housing, a shaft journalled in the spider elements and extending therebetween and through the housing, sun gears on the shaft, planetary gears on the respective spider elements and meshing with the corresponding sun gears of the shaft, internal ring gears respectively meshing with the respective sets of planetary gears, each of said ring gears having a bevel gear integral therewith and extending toward the center of the housing, a brake device on the exterior of the housing and having a shaft journalled on the housing and extending thereinto, a bevel gear on the brake shaft connecting together the bevel gear formations of the respective ring gears whereby power is transmitted between the ring gears when the brake is not applied, a second exterior brake device having a shaft extending into the housing from the side opposite to which the first mentioned brake shaft extends, a gear on the shaft of the second brake device, a gear on the shaft that extends between the spider elements, said gear cooperating with the gear on the shaft of the second brake device, said brake devices being adapted to work in unison to apply one while releasing the other, and common means connected to the brake devices to operate the same.

2. A gear transmission comprising a housing, end closures on the housing, input and output spider elements respectively journalled in the closures at opposite ends of the housing, a shaft journalled in the spider elements and extending therebetween and through the housing, sun gears on the shaft, planetary gears on the respective spider elements and meshing with the corresponding sun gears of the shaft, internal ring gears respectively meshing with the respective sets of planetary gears, each of said ring gears having a bevel gear integral therewith and extending toward the center of the housing, a brake device on the exterior of the housing and having a shaft journalled on the housing and extending thereinto, a bevel gear on the brake shaft connecting together the bevel gear formations of the respective ring gears whereby power is transmitted between the ring gears when the brake is not applied, a second exterior brake device having a shaft extending into the housing from the side opposite to which the first mentioned brake device extends, a gear on the brake shaft of the second brake device, a gear on the shaft that extends between the spider elements, said gear cooperating with the gear on the brake shaft of the second brake device, said brake devices being adapted to work in unison to apply one brake device while releasing the other, and common means connected to the two brake devices to operate the same, said brake devices and control means therefor being adapted to effect release of both brake devices simultaneously whereby rotation of the input spider rotates the output ring gear and sun gear in opposite directions to effect spinning of the output planetary gears on their axes and consequent state of rest of the output spider.

3. An automatic differential leverage brake control and variable transmission comprising a housing, an input planetary unit within and at one end of the housing, an output planetary unit within and at the opposite end of the housing, a shaft extending between the planetary units, said units including sun gears, said sun gears being fixed to the shaft, and two brake devices exterior of and at opposite sides of the housing, one of said devices being connected to the shaft to control rotation of the same and the sun gears thereon, and the other device being connected to the planetary gearing independently of the sun gears thereof, and leverage means connected between the brake devices to effect the joint operation of the same.

4. A transmission comprising a pair of planetary gear units, each unit comprising a sun gear, an internal ring gear and planetary gears each in mesh with both the sun and ring gear, a shaft fixed to and directly connecting the two sun gears to rotate together in the same direction, gearing interconnecting the two ring gears to rotate in opposite directions, an input shaft having a spider mounting the planetary gears of one unit, an output shaft having a spider mounting the planetary gears of the other unit, a brake means for holding the sun gears against rotation, a second brake means for holding the ring gears against rotation, and means for operating the brakes.

5. A transmission comprising a pair of planetary gear units, each unit comprising a sun gear, an internal ring gear and planetary gears each in mesh with both the sun and ring gear, a shaft fixed to and directly connecting the two sun gears to rotate together in the same direction, gearing interconnecting the two ring gears to rotate in opposite directions, an input shaft having a spider mounting the planetary gears of one unit, an output shaft having a spider mounting the planetary gears of the other unit, a brake means for holding the sun gears against rotation, a second brake means for holding the ring gears against rotation, said brakes being also adapted to selectively free said sun gears and ring gears for rotation, and means for operating the brakes.

6. A transmission comprising a pair of planetary gear units, each unit comprising a sun gear, an internal ring gear and planetary gears each in mesh with both the sun and ring gear, a shaft fixed to and directly connecting the two sun gears to rotate together in the same direction, gearing interconnecting the two ring gears to rotate in opposite directions, an input shaft having a spider mounting the planetary gears of one unit, an output shaft having a spider mounting the planetary gears of the other unit, a brake means connected to the shaft that connects the sun gears, a second brake means connected to said interconnecting gearing, and common means for operating said brakes to, selectively, free both the first-named shaft and the interconnecting gearing for rotation, to hold the first-named shaft and sun gears thereon against rotation, and to hold the ring gears and the interconnecting gears against rotation.

7. A transmission comprising a pair of planetary gear units, each unit comprising a sun gear, an internal ring gear and planetary gears each in mesh with both the sun and ring gear, a shaft fixed to and directly connecting the two sun gears to rotate together in the same direction, gearing interconnecting the two ring gears to rotate in opposite directions, an input shaft having a spider mounting the planetary gears of one unit, an output shaft having a spider mounting the planetary gears of the other unit, a brake means connected to the shaft that connects the sun gears to hold the same and the sun gears against rotation whereby the units, upon rotation in one direction of the input shaft, will effect a drive in the reverse direction of the output shaft, and a second brake means connected to the interconnecting gearing to hold the same and the ring gears thereon against rotation whereby said units will effect drive of the output shaft in the same direction as the input shaft.

CHRISTIAN B. WOLFF, Jr.

REFERENCES CITED

The following references are of record in the file of this patent:

UNITED STATES PATENTS

| Number | Name | Date |
|---|---|---|
| 1,228,984 | Stewart | June 5, 1917 |
| 1,333,952 | Ward | Mar. 16, 1920 |

FOREIGN PATENTS

| Number | Country | Date |
|---|---|---|
| 442,952 | Germany | Apr. 12, 1927 |
| 545,285 | Great Britain | May 19, 1942 |